2,835,222

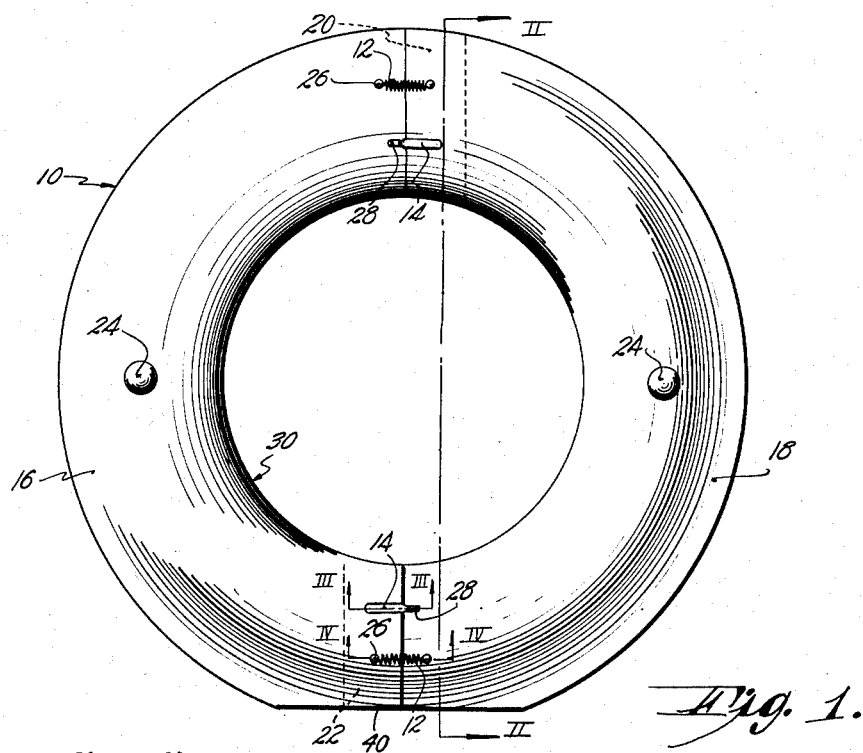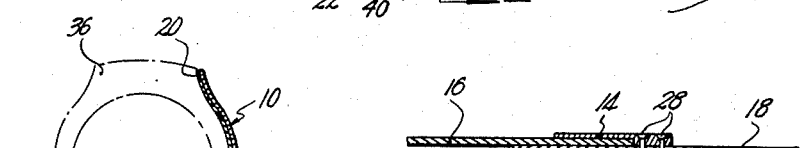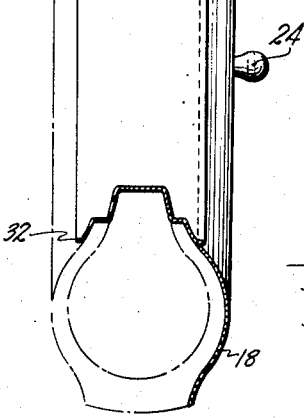

MASKING DEVICE FOR TIRE SIDE-WALLS

Charles N. Hall, Winfield, Kans.

Application May 28, 1954, Serial No. 433,069

4 Claims. (Cl. 118—505)

This invention relates to the masking of objects before painting and particularly to a new and improved masking device for automobile tire and wheel assemblies.

The most important object of the present invention is the provision of a segmental masking ring which, when in place, covers the entire, exposed sidewall of a tire without any need for removing the tire and wheel assembly from an automobile before spray painting the wheel and the adjacent areas of the automobile.

Another important object of the present invention is to provide a segmental masking ring having relatively shiftable segments, thereby permitting expansion of the ring so that the inner edge thereof may be fitted between the lip of the wheel rim and the tire sidewall itself.

A further object is the provision of spring means interconnecting the segments and urging the latter into a symmetrical, normally circular disposition.

Another object of the present invention is to provide guide brackets on each segment, each of which slidably receives one end of the other segment to prevent buckling and angular displacement between the segments of the masking ring.

With these and other objects in view, the masking device of the present invention comprises, generally, a segmental ring having an inner peripheral edge adapted to fit between the sidewall and the rim of a wheel; spring means yieldably interconnecting adjacent segments; and a guide bracket on each segment which slidably receives one end of the next adjacent segment for holding the segments against angular displacement, all as mentioned above.

Other objectives include the provision of segments having an arcuate configuration conforming to that of a tire sidewall; the provision of opposed handle members on the ring for facilitating spreading of the segments; and the cutting away of a portion of the outer periphery of the ring to provide a chord-like edge section which may be placed adjacent the floor of a shop to compensate for the flattening of the tire by the weight of the automobile itself.

Figure 1 is a side elevational view of the masking device of the present invention.

Fig. 2 is a sectional view taken on line II—II of Fig. 1.

Fig. 3 is an enlarged, fragmentary, sectional view taken on line III—III of Fig. 1; and Fig. 4 is an enlarged, fragmentary, sectional view taken on line IV—IV of Fig. 1.

In the refinishing of automobiles, there are several methods for protecting the sidewalls of the tires thereon during the spraying operation. For example, the tires may be removed from the wheels. Similarly, a paint masking compound may be applied to the tire while it is mounted on the automobile. These and other procedures necessarily involve a considerable amount of time in disassembling and reassembling or in application and removal of the paint masking compound. Another commonly practiced method is that of washing the tire with a liquid paint thinner or solvent immediately after the paint spraying operation is completed.

Manifestly, the use of a masking device which is both quick and positive in operation is highly preferable to any of the above mentioned alternatives.

Referring now to the drawing, wherein like numerals indicate similar parts, the paint spray masking device of the present invention includes, as elements thereof, an expansible ring 10, springs 12 and guide brackets 14.

The ring 10 has opposed segments 16 and 18, each of the latter being substantially semi-circular, and having at one end thereof an extension 20 or 22 respectively. Each of the segments 16—18 is also provided with a handle 24 intermediate the ends thereof.

As is best illustrated in Fig. 2, ring 10 has an arcuate configuration conforming substantially to the shape of the tire sidewall. The segments 16—18 may be stamped out of flat stock sheet aluminum and formed in dies to the desired configuration.

Referring to Fig. 1, the segments 16—18 are interconnected by springs 12, the latter being rigidly attached at each end thereof to one of the segments 16—18 by means of fasteners 26.

The brackets 14 are attached to the segments 16—18 by fasteners 28 in such a manner that the brackets 14 extend in opposite directions in overlapping relationship to the proximal ends of the segments 16—18 respectively. Referring particularly to Fig. 3, it is seen that one end of segment 16 slidably engages extension 22 of segment 18 between the latter and bracket 14.

It is to be noted that the segment 18 overlies extension 20 of segment 16 and that segment 16 overlies extension 22 of segment 18. Viewing Fig. 3, it is obvious that the elongated brackets 14 will permit limited, relative sliding movement between segments 16—18 and, at the same time, prevent buckling of the ring 10. For example, as long as segment 18 overlies extension 20 of segment 16, and as long as the bracket 14 on segment 16 overlies the proximal end of segment 18, there is no possibility of angular displacement between segments 16—18.

In operation, an operator need only grasp the handles 24, spread the segments 16—18 slightly against the bias of springs 12, and fit the inner peripheral edge 30 of ring 10 within the lip 32 of a rim 34, which carries a tire 36, the inner diameter of ring 10 being substantially equal to the diameter of rim 34. Then, the springs 12, the brackets 14 and the arcuate configuration of ring 10 combine to hold the masking device in place in covering relationship to the sidewall of tire 36.

Referring again to Fig. 1, it is noted that each of the segments 16—18 is cut away adjacent one of the joints therebetween to provide a chord-like edge 40, which compensates for the flattening out of tire 36 by the weight of the automobile on which it is mounted.

It is obvious that the embodiment of the present invention herein disclosed is a preferred form only and that many changes or modifications may be made therein without departing from the broad principles of the present invention. Such changes or modifications are contemplated hereby and it is, therefore, desired to be limited only by the scope of the appended claims.

Having thus described the invention, what is claimed as new and desired to be secured by Letters Patent is:

1. A device adapted for masking the tire sidewall of an automobile wheel and tire assembly during painting of the automobile comprising a disk-like, segmented annulus having an inner peripheral edge adapted to fit between the tire sidewall and the rim of said wheel in a manner to hold the annulus against the sidewall, each segment of the annulus having an arcuate transverse cross-sectional configuration substantially conforming to the sidewall of the tire, each of said segments having an end portion normally overlapping the proximal end portion of the next adjacent segment and each segment being shiftable inwardly and outwardly toward the center of said annulus whereby the diameter of the inner peripheral edge is variable, the amount of overlapping of said proximal portions of adjacent ends of the segments being substantially uniform irrespective of shifting of the segments inwardly and outwardly; yieldable means interconnecting proximal end portions of adjacent segments for urging the portions into said variable overlapping relationship; and guide means on one end portion of each segment respectively engaging the end portion of the next adjacent segment for holding the segments in a substantially common plane and preventing angular displacement of the same.

2. A device as set forth in claim 1 wherein said yieldable means comprises an elongated spring having each end thereof secured to opposed end portions of the segments.

3. A device as set forth in claim 1 wherein each of said guide means comprises an L-shaped element having an elongated leg adapted to engage one face of one of the segments and a base leg operating as a stop to limit shifting of the proximal end portion of the next adjacent segment in one direction.

4. A device as set forth in claim 1 wherein the outermost peripheral edge of the annulus is cut away to present a chord-like edge which compensates for flattening of the tire by the weight of the automobile.

References Cited in the file of this patent

UNITED STATES PATENTS

| | | |
|---|---|---|
| 1,068,892 | Green | July 29, 1913 |
| 1,482,892 | Goehner | Feb. 5, 1924 |
| 1,594,710 | Buffington et al. | Aug. 3, 1926 |
| 1,684,420 | Sutherland | Sept. 28, 1928 |
| 1,918,549 | McCormick | July 18, 1933 |
| 1,920,167 | Bird | Aug. 1, 1933 |
| 2,324,184 | Wyman | July 13, 1943 |
| 2,357,144 | Stair | Aug. 29, 1944 |
| 2,634,704 | Morrison | Apr. 14, 1953 |